Figure 1:
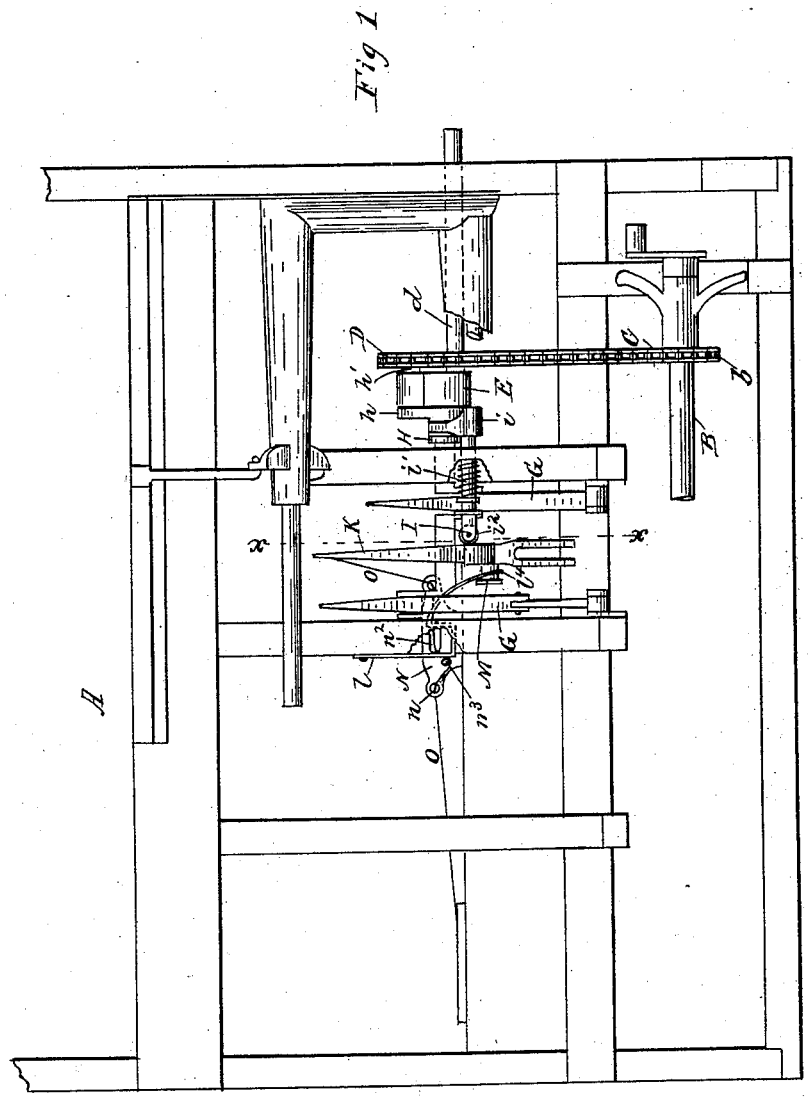

(No Model.) 3 Sheets—Sheet 1.

G. G. HUNT & G. H. STEWARD.
GRAIN BINDER.

No. 318,257. Patented May 19, 1885.

Witnesses
W. C. Coulies.
A. M. Best.

Inventors
George G. Hunt
George H. Steward
By Coburn & Thacher
Attorneys (No Model.) 3 Sheets—Sheet 2.
G. G. HUNT & G. H. STEWARD.
GRAIN BINDER.
No. 318,257. Patented May 19, 1885.
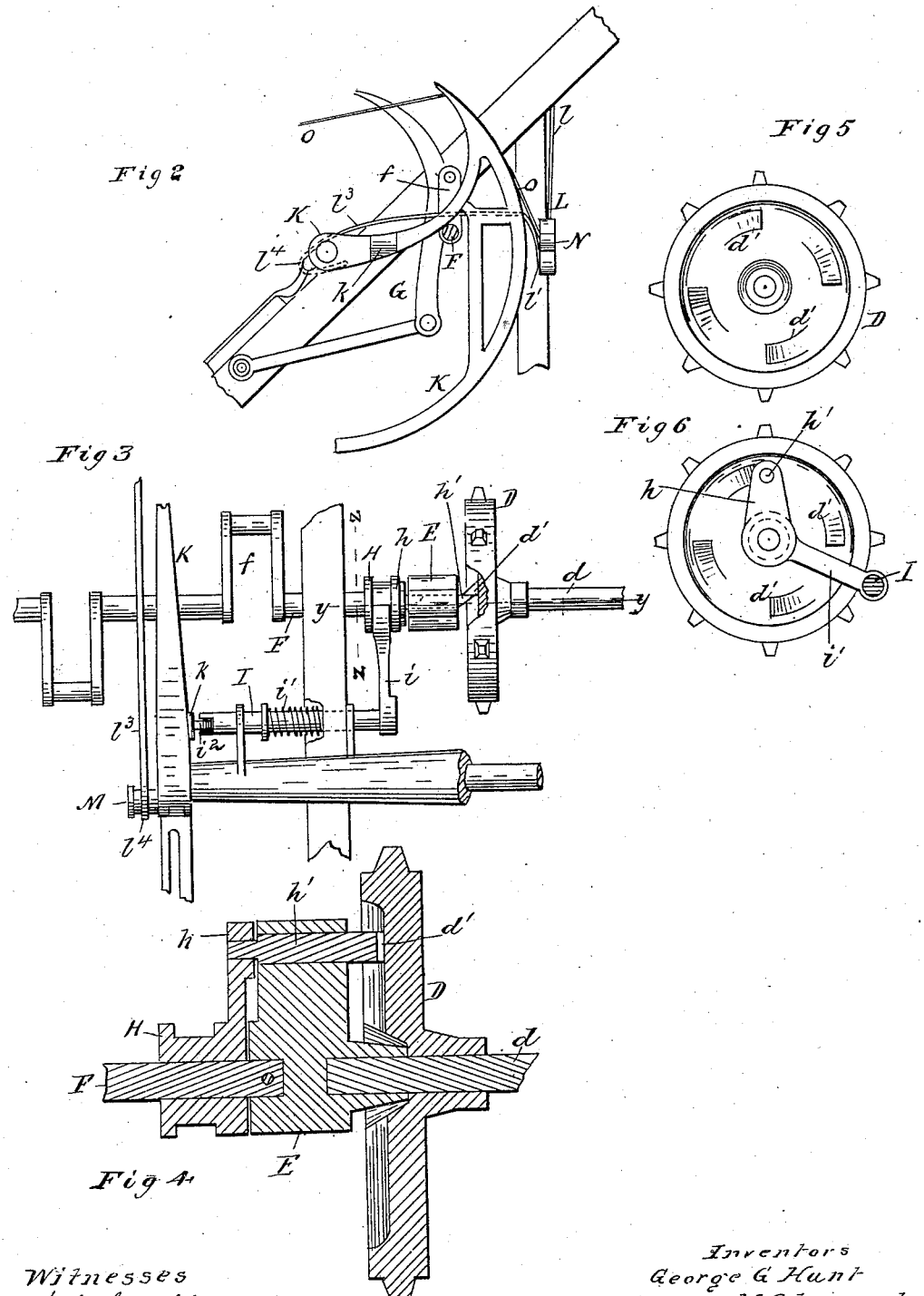
Witnesses
W. C. Colles
A. M. Best
Inventors
George G. Hunt
George H. Steward
By Coburn & Thacher
Attorneys (No Model.) 3 Sheets—Sheet 3.
G. G. HUNT & G. H. STEWARD.
GRAIN BINDER.
No. 318,257. Patented May 19, 1885.
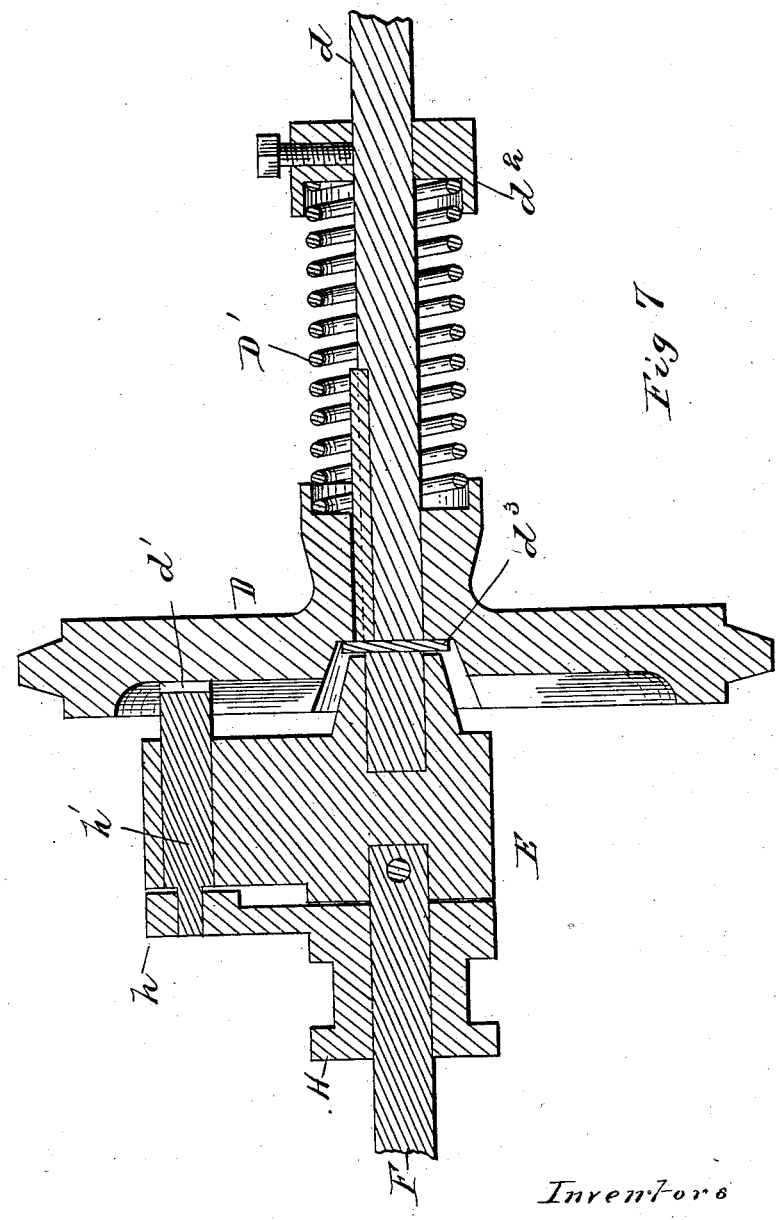
Witnesses
W. C. Coalies
A. M. Best
Inventors
George G. Hunt
George H. Steward
By Coburn & Thacher
Attorneys

UNITED STATES PATENT OFFICE.

GEORGE G. HUNT, OF BRISTOL STATION, AND GEORGE H. STEWARD, OF PLANO, ASSIGNORS OF THREE-FOURTHS TO THE PLANO MANUFACTURING COMPANY, OF PLANO, ILLINOIS.

GRAIN-BINDER.

SPECIFICATION forming part of Letters Patent No. 318,257, dated May 19, 1885.

Application filed December 28, 1882. (No model.)

*To all whom it may concern:*

Be it known that we, GEORGE G. HUNT, residing at Bristol Station, in the county of Kendall and State of Illinois, and GEORGE H. STEWARD, residing at Plano, in the county of Kendall and State of Illinois, both citizens of the United States, have invented certain new and useful Improvements in Grain-Binders, which are fully set forth in the following specification, reference being had to the accompanying drawings, in which—

Figure 1 represents a side elevation of so much of the grain-binder as is necessary to illustrate our present invention; Fig. 2, a detail section taken on the line $x\ x$, Fig. 1; Fig. 3, a detail plan, on an enlarged scale, of the mechanism for stopping and starting the packers; Fig. 4, a detail section on a still further enlarged scale, taken on the line $y\ y$, Fig. 3; Fig. 5, an elevation of the driving sprocket-wheel on the same scale as Fig. 3; Fig. 6, a detail section on the same scale, taken on the line $z\ z$, Fig. 3; and Fig. 7, a detail section through the sprocket-wheel and shaft on a still more enlarged scale.

Our invention relates to that class of grain-binders in which packers are used to form the bundle before it is bound, and in which cord is used for the band. Our present improvements relate to the mechanism for stopping and starting the packers by the movement of the binding-arm. We have therefore shown in the drawings only so much of a grain-binder as is necessary to illustrate the construction and operation of these improvements, and only such parts will be herein described, it being understood that in features not shown and described the machine may be of any ordinary construction.

We will proceed to describe in detail the construction and operation of the improvements to which our present application is restricted, and will then point out definitely in the claims the parts which we believe to be new and wish to protect by Letters Patent.

In the drawings, A represents a portion of the frame-work of the binder, which is mounted on or attached to the main frame of the harvesting-machine in any usual way. A section of a shaft, B, is shown, from which motion is communicated to the mechanism of the binder, in this instance this shaft being the cutter crank-shaft of the harvester. As shown in the drawings, it is provided with a sprocket-wheel, $b$, to which is applied a sprocket-chain, C, that also passes over a sprocket-wheel, D, fixed on a shaft, $d$, on the binder-frame. The inner face of the sprocket-wheel D is depressed or dishing, as shown in Fig. 4 of the drawings, and is provided with a series of projections or stops, $d'$, one face of which is substantially perpendicular to the face of the wheel. The shaft $d$ terminates in a block, E, in which it is journaled, so as to rotate independently of the block, and on the outer side of this block is the usual shaft, F, for driving the packing-arms, being provided with cranks $f$, on which the packing-arms G are mounted and arranged to operate in the well-known way. The inner end of the shaft F terminates in the block E, to which it is secured, so that it rotates with the block.

On the inner end of the shaft F is an ordinary loose clutch-sleeve, H, provided with the usual circumferential groove to receive a shipping-lever. An arm, $h$, extends upward from the sleeve by the side of the block E, and carries at its upper end a clutch-pin, $h'$, which passes loosely through an opening in the block E, and is constructed and arranged to engage with the stops or projections on the inner face of the wheel D when projected sufficiently far beyond the face of the block.

Sometimes it may happen that the position of the sprocket-wheel is such that when the clutch-pin is forced out toward the wheel it will strike one of the projections, when, of course, there would be danger of breakage. To avoid this the sprocket-wheel D may be mounted on its shaft by an ordinary spline-and-groove connection, so that the wheel may have a lateral movement on the shaft $d$, and to keep the sprocket-wheel up in its required working position a spiral spring, D′, may be coiled on the shaft $d$ between the sprocket-wheel and a collar, $d^2$, on a shaft or the shaft-box near the driving-shaft. Obviously this spring will permit the sprocket-wheel to yield under the condition mentioned above sufficiently to avoid any injury to the parts, while at the same time it is held in proper position under all ordinary circumstances. A pin, $d^3$, or suitable stop of some kind, is arranged on the shaft $d$ inside of the sprocket-wheel, to prevent the latter from being forced beyond its working position by the action of the spring. It will be seen from this description that the sprocket-wheel is fastened to the shaft, so as to turn therewith, and is held up into working position with the clutch mechanism, so that the packer-shaft may be readily connected and disconnected from the said sprocket-wheel, while at the same time the wheel will yield and slide sufficiently on its shaft to prevent breakage in case the clutch-pin should strike directly against one of the clutch projections on the face of the wheel. It is evident that by this clutching device the packer-shaft will be connected to the sprocket-wheel shaft, so as to be driven thereby, but will be disconnected therefrom upon withdrawing the clutch-pin, so as to disengage it from the projections on the said wheel, when, of course, the packer-shaft will be stopped and the packers stand at rest. The shipping device by means of which we accomplish this result consists of a bar, I, mounted horizontally in one of the cross-beams of the frame, so as to slide back and forth in a line substantially parallel with the two shafts. On one end of this bar is fixed an arm, $i$, which projects downward and inward to the clutch-sleeve, at its lower end being provided with a fork, which embraces this sleeve in the groove thereof. On the other side of the frame cross-bar a spiral spring, $i'$, is wound around this sliding bar, being seated in the frame-bar in its inner end and held at its outer end by a collar on the sliding bar. This spring, as will be seen from Fig. 3 of the drawings, has a tendency to throw the shipping-bar away from the clutch, which would thereby slip the clutch-sleeve on the packer-shaft and unclutch the latter from the sprocket-wheel; but in order to clutch the two together, so as to drive the packer-shaft, it is necessary to force the shipping-bar toward the sprocket-wheel, thereby compressing the spring. This we accomplish by the movement of the binding-arm or needle K when it is opened. The end of the shipping-bar farthest from the clutch is arranged so that when the binding-arm is opened it will come in contact with this end of the bar.

A cam-piece, $k$, may be placed on the binding-arm, or the binding-arm may be so formed as to make an enlargement at this point, which is so shaped as to present an incline to the end of the shipping-bar, so as to push the latter toward the clutch when the binding-arm is opened, and thus cause the clutch to engage with the sprocket-wheel, and a roller, $i^2$, may be mounted in the end of the shipping-bar to reduce friction.

Now, the parts are so arranged that the binding-arm will come in contact with the shipping-bar and operate the clutch just at the last of its opening movement, when the machine is all ready to receive grain for a new bundle, and obviously at once the packers will be set in motion, as required, and will be kept in motion while the bundle is being formed, because the binding-arm stands at rest during this period, and so will hold the packer-shaft clutched to the sprocket-wheel; but as soon as the bundle is formed and the binding-arm commences its closing movement, it will at the first part of this movement be freed from the shipping-bar, when the spring will act to slide the latter in a direction to unclutch the packer-shaft, and consequently the packers will stop and remain at rest while the bundle is being bound, which is the time when it is desired they should be motionless.

We have shown in Fig. 2 of the drawings a special tension device (designated by the letters L, $l$, $l'$, $l^2$, $l^3$, and $l^4$) and a cord-guide, N; but these devices are not included in our present invention, and will be made the subject-matter of a separate application.

The other parts of the machine we have not shown and described, as they may be of any ordinary construction, and do not constitute a part of our present invention, and we do not wish to be understood as limiting these improvements to any particular machine. Neither do we wish to be understood as limiting these improvements to specific details of construction precisely as here shown and described, for these details may be modified without departing from the principle of our improvements.

Having thus described our invention, what we claim as new, and desire to secure by Letters Patent, is—

1. In a grain-binder, an independent packer-shaft, in combination with a separate driving-shaft, clutch mechanism for connecting and disconnecting said shafts, a binding-arm, and mechanism for operating the clutch, constructed and arranged to be operated by the opening and closing of the binding-arm, substantially as and for the purposes set forth.

2. The packer-shaft F, in combination with the drive-wheel D on the independent shaft $d$, and the clutch H $h'$ on the packer-shaft, whereby the latter may be connected to and disconnected from the driving-shaft, substantially as described.

3. The block E, in combination with the packer-shaft F, attached to said block, the clutch H $h'$, the independent shaft $d$, mounted loosely in the block E, and the wheel D, mounted on said shaft and provided with clutch-stops, substantially as described.

4. The wheel D, mounted on the shaft $d$, in combination with the independent packer-shaft F, the clutch H $h'$, the spring shipping device I. $i$, and the binding-arm K, substantially as and for the purposes set forth.

GEORGE G. HUNT.
GEORGE H. STEWARD.

Witnesses:
O. E. NASH,
W. K. JONES.